May 2, 1933.  W. D. CARTER  1,906,740
FLUID PUMPING AND MIXING DEVICE
Filed March 2, 1926  2 Sheets-Sheet 1
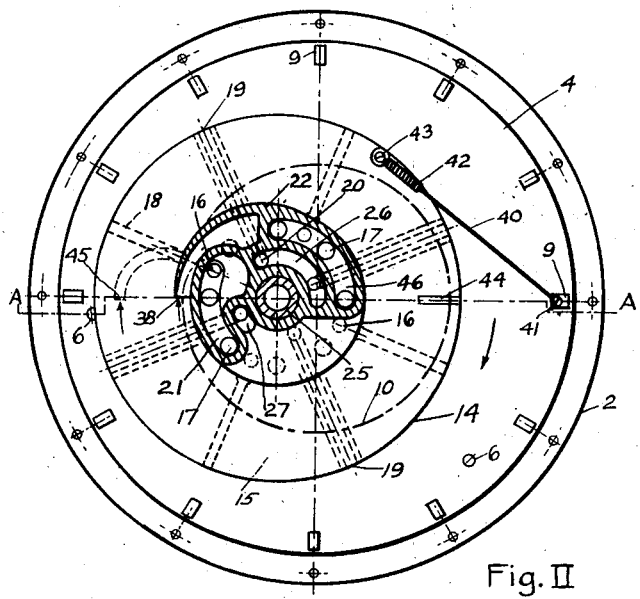
Fig. II
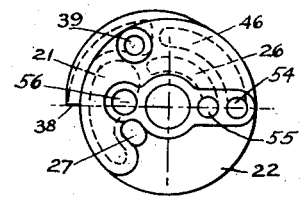
Fig. IV.
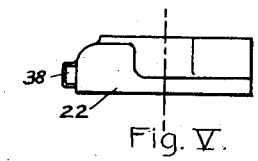
Fig. V.
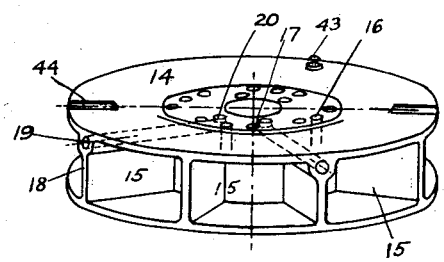
Fig. III.
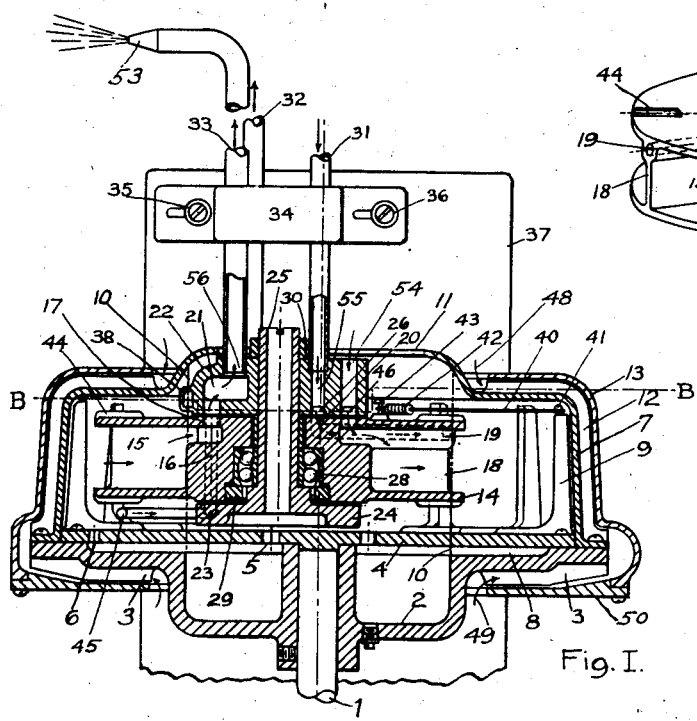
Fig. I.
WITNESSES
John Whyte
Henry B. Carter
INVENTOR
Wm Douglas Carter

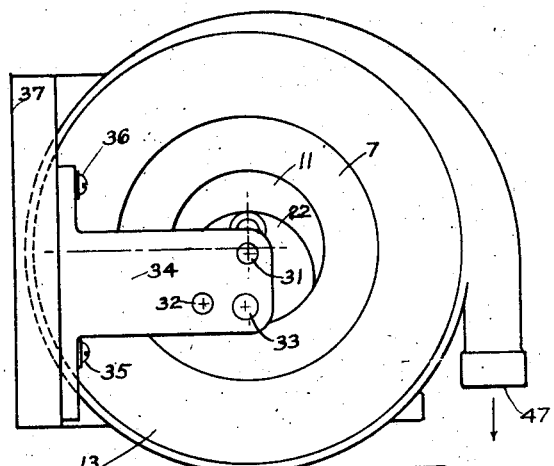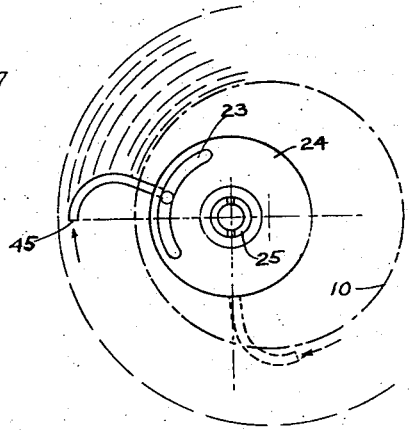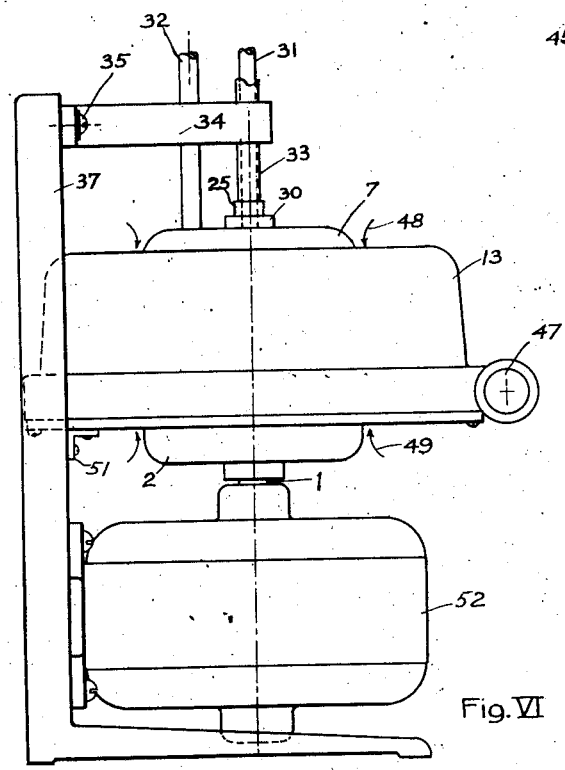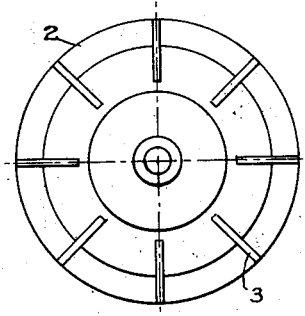

Patented May 2, 1933

1,906,740

UNITED STATES PATENT OFFICE

WILLIAM DOUGLAS CARTER, OF CALDWELL, NEW JERSEY, ASSIGNOR TO CARRIER CORPORATION, OF NEWARK, NEW JERSEY, A CORPORATION OF DELAWARE

FLUID PUMPING AND MIXING DEVICE

Application filed March 2, 1926. Serial No. 91,712.

This invention relates primarily to rotary positive displacement gas compressors having a liquid seal, and pertains particularly to that class of pumps having a central rotary member or wheel eccentrically mounted with respect to the casing in which a sealing fluid, such as water, is employed to draw in or compress a lighter fluid, such as air, between the wheel and the casing.

Since the maximum gas pressure obtainable in this type of pump cannot exceed the pressure of the sealing liquid, and since the pressure of the sealing liquid depends largely upon its rate of rotation, it is important that the rotation of the sealing liquid be maintained efficiently with a minimum of slip and friction loss.

Certain features of this invention may also be applied to pumps in which the mechanical parts cooperate so closely as to make a liquid seal unnecessary, but it's application to a liquid-seal type of pump, in which the seal acts as a liquid piston, will be described in this specification.

In the preferred construction of this pump both the wheel and the casing are made to revolve with the sealing liquid so that the fluid friction is reduced to a minimum. Separate means are provided for pumping the sealing liquid to the casing; for expelling surplus liquid from the casing; and for carrying away the heat generated in compressing the gas.

While this pump is used most frequently for compressing a gas such as air, with a liquid seal, it is possible to employ two liquids or two gases of different specific gravities—the heavier fluid acting as the sealing fluid. For instance water could be pumped, using mercury as a sealing liquid, and a high pressure obtained with comparatively little friction loss. The pump may also be adapted, with some modification, to operate in a horizontal shaft position.

The construction illustrated has special features which adapt it particularly to use in connection with oil burners wherein a small quantity of oil, comprising the sealing liquid, is mixed with a much larger quantity of air and discharged under pressure into the furnace. This loss of oil is made up through the special means provided to entrain additional oil into the pump. Other uses will be apparent.

One of the objects of this invention is to avoid turbulence and slip by driving both the wheel and casing at the same speed.

Another object is to provide automatic means for gradually supplying the sealing fluid to the casing when starting the pump, so as to avoid turbulence and splash in bringing the fluid up to speed.

Another object is to provide a simple means for cooling the pump by circulating air against the outside of the rotating casing.

Another object is to provide adjustable means for discharging a proportion of the sealing fluid as a spray with the lighter fluid, without resorting to throttling restrictions likely to clog.

Another object is to provide a wheel with separate passages for pumping the two different fluids at the same time.

Another object is to control the performance of the pump by varying the eccentricity of the wheel in the casing.

Another object is to avoid the friction and leakage of stuffing boxes.

Further objects will appear.

This invention consists of the parts and the construction and combination of parts as hereinafter more fully described and claimed, having reference to the accompanying drawings, in which Figure I is a longitudinal cross-section of the pump taken on line A—A of Fig. 2.

Figure II is a plan view of the construction shown in Fig. I taken along line B—B, and having the upper part of the case and the housing of the blower removed.

Figure III is a perspective view of the impeller—the top view of which is shown in Fig. II, and a cross-section in Fig. I.

Figure IV is a plan view of the distributor, also shown in transverse section in Fig. II, and in longitudinal section in Fig. I.

Figure V is a side view of the distributor.

Figure VI is a side elevation of the assembled pump and motor.

Figure VII is a top view of the assembled unit.

Figure VIII is a top view of the burner oil-supply scoop, illustrating its adjustable feature.

Figure IX is a bottom view of the reservoir part of the casing showing the radially disposed vanes which form part of the impeller of the air cooling fan or blower.

Referring to the drawings in detail, 1 is a vertical motor shaft upon which is mounted the rotating reservoir casing 2, which carries on its underside radially disposed vanes or ribs 3. Reservoir plate 4 closes the top of reservoir 2 but has holes 5 near the center of the plate for admitting liquid to the reservoir, and smaller holes such as 6 nearer the periphery of the plate to allow the liquid in the reservoir to escape slowly by centrifugal force when the reservoir is started in rotation. Obviously, holes 6 also permit some of the liquid to return to the reservoir when rotation stops, but their chief object is to supply the liquid gradually to the rotating casing 7 so as to avoid splash and turbulence in bringing the liquid up to speed. Reservoir 2 has a shallow passage 8 connecting with holes or conduit openings 6. Plate 4 carries a number of posts or blades 9 which serve to minimize the slip and to make the sealing liquid rotate with casing 7.

Line 10 represents the inner cylindrical surface of the sealing liquid when the casing 7 is rotating. Hole 11 is concentric with casing 7, and is smaller than the circle of line 10 so that the liquid will not spill out when the pump is running. The liquid will fall away from opening 11 by gravity when the pump comes to rest, and will assume a horizontal level below the top face of wheel 14.

If, in any given installation, the liquid supply and return pipes 31 and 32 should be carried downward to a liquid supply tank beneath the level of the pump, there would be a tendency to siphon the liquid from the casing 7 when the pump stops operating; but owing to the fact that the sealing liquid in the casing falls below the top face of wheel 14 and below scoop 38, air will enter at these points and thereby prevent any loss of sealing liquid below these levels.

Radially disposed vanes or ribs 12 (see Fig. I) are attached to casing 7, similarly to vanes 3 on reservoir 2 (see Figs. I and IX). These vanes 12 together with vanes 3 are enclosed within the housing 13 and housing cover 50, which cover is attached at 51 (Fig. VI) to stationary frame 37. These vanes and housing constitute an air pump or fan for drawing air along the surface of casing 7 and reservoir 2, so as to carry away the heat of compression generated within casing 7. 47 (Figs. VI and VII) is the discharge opening of the fan and arrows 48 and 49 indicate the inlet openings thereto. 52 represents the motor driving the pump.

14 is a wheel having radially disposed pockets 15 formed between its two side discs and the radially disposed arms 18. Some of the arms 18 have holes 19 extending radially from the periphery to connect with other but axially disposed holes 20 in the hub. Said holes 20 are arranged on a circle close to, and concentric with, the axis of the wheel.

Arranged on a larger circle, also concentric with the axis of wheel 14, are a number of other holes 16 extending through the hub and running parallel to the axis of the wheel. This last set of holes register with the port 21 in distributor conduit-member 22; and simultaneously, at the bottom of the wheel, with channel 23 in the flange 24 of hollow axle 25. Various other forms of conduit-members can be adapted to convey fluid to or from the wheel.

All of the holes 16 in this circle also register at intervals with port 46 in distributor 22 but no flow is established through holes 16 at that time for the reason that holes 16 are then closed at their lower ends by flange 24. Air reaches port 46 through opening 54.

Said holes 20 register with ports 26 and 27 (see Figs. II and IV) in distributor 22, and thereby connect radial holes 19 with said ports 26 and 27 at predetermined intervals in each revolution of the wheel. Opening 55 connects port 26 with pipe 31.

Located between said holes 16 in the larger circle on wheel 14, are other holes 17 extending through the top of the wheel and connecting with pockets 15 between the arms 18.

The wheel 14 is mounted on ball-bearing 28 which is held in the hub by means of threaded collar 29, and carried by axle 25 which is rigidly attached by means of nut 30 to the distributor 22.

Distributor 22 is supported by the three pipes 31, 32 and 33 held in bracket 34 which is slidably attached by means of screws 35 and 36 to frame 37. This permits adjustment of the eccentricity of the axis of wheel 14 with respect to the axis of casing 7.

31 is a pipe for supplying sealing fluid to the pump. 32 is a return pipe for conveying any surplus sealing fluid back to the source of supply. 33 is the main air discharge pipe which, in the service herein described, conveys a spray or fog of oil and air from port 21, through opening 56 to the burner nozzle 53.

Distributor 22 carries the overflow scoop 38 which connects through opening 39 (see Fig. IV) with return pipe 32, and prevents the accumulation of liquid in casing 7 in excess of the rotating surface indicated by line 10. Scoop 38 constitutes a simple preferred form of pumping element for returning excess oil to the source of supply, just as the impeller constitutes a pumping element of a different type for supplying oil to the casing.

40 is a connecting rod pivotally attached at 41 to one of the posts 9, and to the spring 42 which is in turn attached to wheel 14 at screw 43. The purpose of this rod and spring is to transmit rotation from casing 7 to wheel 14,—the spring serving to compensate for the adjustable eccentric mounting of casing 7 with respect to wheel 14 so as to transmit rotation smoothly from the casing to the wheel. In order more effectively to transmit uniform rotation to the wheel, wings 44 are provided on the sides of wheel 14 to receive the impulse of the revolving liquid and thereby counteract the varying angle of pull from the spring due to the eccentricity of the two connected members.

The adjustable spray scoop 45 receives the impact of the sealing liquid and maintains fluid pressure in channel 23 with which it is connected. The axle 25 is provided with a slot in its upper end, as shown in Fig. 1. A key or screw driver inserted in this slot enables axle 25 to be rotated, whereupon flange 24 and scoop 45, fixedly attached to the axle will be turned. By rotating the axle 25, the scoop 45 can be subjected to a lower velocity of liquid, since the axle 25 is not concentric with the axis of rotation of the liquid. The full lines in Fig. VIII illustrate the high pressure position of the scoop 45, and the dotted lines show its position when rotated nearer to the center of the whirling ring of sealing fluid. Although the amount of liquid passing through the scoop 45 and connecting passages is very small, the intermittent nature of the flow effectively prevents coagulation and stoppage therein.

For many services the pump would be required merely to compress a gas without injecting a spray of the sealing liquid into the discharged gas. In such cases spray scoop 45 and usually scoop 38 are not required.

While the use of this pump is by no means confined to its connection with oil burners, the construction shown is particularly adapted to that service, and its operation will therefore be described in that application.

Supply pipe 31 is connected with the oil-supply tank which is not shown and which will be assumed to be located somewhat lower than the pump. Return pipe 32 conveys surplus oil from return scoop 38 back to the supply tank. The pump is primed by filling reservoir 2 with furnace oil, which in this case is used as the sealing liquid.

When rotation occurs the oil in reservoir 2 is thrown outward through passage 8 as fast as it can flow through the small holes 6 into the rotating casing 7, which it gradually fills to approximately the inside cylindrical surface indicated by line 10. Any surplus over this amount will obviously be returned by scoop 38 through opening 39 and return pipe 32, to the oil supply tank.

Coincident with the starting of the rotation of the casing 7 the wheel is being brought up to speed by means of connecting rod 40, so that all surfaces in contact with the revolving oil are rotating at approximately the same speed.

Since the rotating ring of oil in casing 7 is not concentric with the rotating wheel, it is obvious that there will be a relative radial motion between the oil and any given point on the wheel. That is, during one half of each revolution represented by the position of the parts shown above line A—A in Fig. II (when the pump is rotating in the direction indicated by the arrows) the oil is receding from the pockets 15; and during the other half (below line A—A) the oil is entering said pockets. When the oil is receding from the pockets 15 and the holes 17 are in register with port 46 in distributor 22, air is entrained into the pockets.

During the other half revolution this air is compressed as the oil presses toward the center of the wheel 14; and air is discharged under pressure through opening 56 and pipe 33 to the burner nozzle 53 when holes 17 come into register with discharge port 21.

By loosening screws 35 and 36 and moving bracket 34, the eccentricity of wheel 14 in casing 7 may be varied. This changes the depth to which pockets 15 dip into the ring of oil and consequently the volume of air displaced.

In the meantime oil pressure is maintained in channel 23 by means of adjustable scoop 45, and small quantities of this oil are injected intermittently into the stream of air passing out of discharge port 21, while the holes 16 in passing, temporarily connect port 21 with channel 23.

The amount of oil injected into the discharged air may obviously be varied by rotating the axle 25, and with it scoop 45 and channel 23 as shown in Fig. VIII. This adjustment not only changes the oil pressure in the channel 23, but also varies the time interval during which channel 23 is connected with discharge port 21. Thus the amount of oil supplied to the burner may be adjusted without resorting to small throttled orifices which are likely to clog.

In the meantime the oil fed to the burner from casing 7 is being replenished from the oil-supply tank (not shown in the drawings) as follows:

Centrifugal force acting on the oil in holes 19 of wheel 14 tends to cause this oil to flow toward the periphery of the wheel and to mingle with the whirling ring of oil in casing 7. This flow can take place (under ordinary speeds of rotation) only when holes 20 register with port 26 in distributor 22, for at that time holes 19 can be filled at their central ends from the storage tank through pipe 31, opening 55, port 26.

If pipe 31 should be full of air instead of oil when the pump is started, then the reciprocating action of the oil in holes 19 (due to the eccentricity of the wheel and the whirling ring of oil) will draw the air into holes 19 when holes 20 are in register with port 26, and will expel said air from holes 19 when holes 20 connect with the atmosphere through port 27. This priming action is the same as that which takes place when air is entrained, compressed, and expelled by the pockets of wheel 14, as previously described.

It will be noted that any air entering through pipe 31 while the pump is priming itself, or entering in small bubbles from leaks in the pipe connections, or through certain types of anti-siphon devices which may be connected in the suction line, will be separated from the oil in the casing by centrifugal action, and so the feeding of oil to the burner nozzle through scoop 45 will not be affected by these air leakages so long as the average quantity of oil drawn from the source of supply is adequate for the requirements of the burner. Usually the amount of oil circulated is many times greater than the quantity fed to the burner nozzle 53.

In cases where it is desirable to supply auxiliary air to a furnace under a positive head, the air discharge 47 (see Figs. VI and VII) from the cooling fan, may be connected to the fire-box. The pressure created by this fan may also be connected to the air inlet opening 54 in distributor 22.

Where the expression "pumping element" is used in the claims, it will be understood to mean one of the main cooperating parts of a pumping mechanism without which no pumping action would result.

That which I claim as my invention and desire to secure by Letters Patent is:

1. In an oil feeding mechanism for oil burners, the combination of an oil pressure means, a discharge conduit communicating with the pressure means, a valve in the path of the conduit, automatic means for opening and closing the valve in a repeating cycle, and controlling means for adjusting the period of time during which the valve remains open so as to control the amount of oil supplied through the conduit.

2. In an oil feeding mechanism for oil burners, a casing for holding a revolving ring of oil, a wheel having pockets with communicating ports formed therein, the wheel being adapted to rotate in the same direction as the oil and alternately to advance into and withdraw through the free surface of the oil so as to fill and empty the pockets and thereby alternately to expel and suck air through the ports, a stationary conduit member co-operating with the wheel to convey air from the ports, and adjustable means for discharging with the air a controlled amount of oil through the conduit member.

3. In an oil feeding mechanism for oil burners, a casing for holding a revolving ring of oil, a wheel having pockets with communicating ports formed therein, the wheel being adapted to rotate in the same direction as the oil and alternately to advance into and withdraw through the free surface of the oil so as to fill and empty the pockets and thereby alternately to expel and suck air through the ports, a stationary conduit member co-operating with the wheel to convey air from the ports, adjustable means for discharging with the air a controlled amount of oil through the conduit member, and a separate oil supply conduit communicating with the casing.

4. In a rotary pump for oil burners, a casing for holding a whirling ring of oil therein, a pocketed wheel eccentrically mounted to rotate in the casing so as to sink more deeply into the ring of oil on one side than on the other and thereby to displace and entrain air from and into the pockets, the wheel also having a set of radially disposed passages formed therein for centrifugally entraining oil into the casing, a stationary distributor member cooperating with the wheel and having separate ports formed therein cooperating with ports formed in the wheel for conveying air to and from the pockets and oil to the passage.

5. In a rotary pump having a casing mounted to rotate on a vertically disposed axis, a partition located in the casing normal to the axis thereof so as to divide the interior of the casing into an upper pumping compartment and a lower reservoir compartment, the partition having formed therein a restricted passage connecting the compartments near their periphery so as to permit fluid to flow by centrifugal force from the reservoir compartment to the pumping compartment when rotation begins in order to supply fluid gradually to the pumping compartment.

6. In a device for producing a mixture of combustible liquid and air, the combination of an eccentric air-pump of the liquid-piston type utilizing a combustible liquid as the liquid element thereof, an air discharge conduit, means for feeding a uniform amount of liquid from said liquid element of the air-pump to the conduit for mixing with the air output thereof as the combustible constituent of said mixture discharged, and automatic liquid-supply means for maintaining the full volume of said liquid element.

7. In a rotary pump, a rotatably mounted casing for revolving a sealing fluid contained therein, a wheel having pockets with connecting ports formed therein and adapted to rotate in the same direction as the sealing fluid, said wheel being eccentrically mounted in the casing so as alternately to advance into and withdraw through the free surface of the sealing fluid so as to fill and empty the pockets and thereby alternately to expel and entrain a lighter fluid through the ports, and means for adjusting the eccentricity of the wheel in the casing so as to vary the fluid displacement in the pockets.

8. In a rotary gas compressor, having a rotatably mounted wheel, a rotatably mounted casing surrounding the wheel with its axis of rotation eccentric to the axis of rotation of the wheel, air impelling vanes attached to the outside wall of the casing, a second stationary casing surrounding the vanes on the first casing, the stationary casing having an air inlet and a discharge opening formed therein for conveying air to and from the vanes between the first and second casings.

9. In a pump for oil burners, a rotatably mounted casing for whirling a ring of oil, a wheel with communicating pockets and ports formed therein, the wheels being eccentrically mounted to rotate in the casing so as to dip more deeply into the oil on one side than the other in order to expel and draw air from and into the pockets, distributing means cooperating with the ports in the wheel for conveying air from the wheel and a stationary conduit with one end directed against the whirling oil and the other end communicating with the distributing means so as to convey oil from the casing to the distributing means.

10. In a pumping mechanism of the character described, a casing for holding a revolving ring of liquid, a supply line for conveying liquid from a fuel source to the ring of liquid in the casing, a discharge line for returning liquid to said source from the ring of liquid in the casing, a feed line for discharging liquid to a burner from the ring of liquid in the casing, and means for maintaining the thickness of said ring of liquid substantially constant.

11. In an automatic valve for oil burners, the combination of an entrance-head and a discharge-head, each head having a smooth surface of revolution with an arcuate channel formed therein about the axes of said surfaces and an opening in each head communicating with its respective channel, a rotatable disc member located intermediate of the entrance-head and the discharge-head and having a pair of surfaces of revolution in close co-operation with the surfaces of revolution of the heads, all of said axes coinciding with the axis of rotation of said disc member, the disc member having formed therethrough one or more separate passages connecting at intervals the channel of the entrance-head with the channel of the discharge-head, means for rotating the disc member, and other means for adjusting the relative angular position of the heads so as to control the time interval in each revolution during which the channels and openings are in communication.

12. A rotatable impeller for spray pumps consisting of a cylindrical shaped body having radially disposed pockets formed in the periphery thereof and ports near the axis of rotation communicating with the pockets so as to convey air to and from the pockets, the body having formed therein also separate channels for impelling liquid to the periphery of the body.

13. In a spray pump, a casing for holding a revolving ring of liquid, an impeller consisting of a cylindrical shaped body having radially disposed pockets formed in the periphery thereof and ports near the axis of rotation communicating with the pockets so as to convey air to and from the pockets, the body having formed therein also separate channels for impelling liquid to the casing.

14. A rotatable impeller for spray pumps consisting of a cylindrical shaped body having radially disposed pockets formed in the periphery thereof and air ports disposed in a circle near the axis of rotation communicating with the pockets, the body having formed therein also separate cavities in the periphery thereof and liquid admission ports opening in a circle near the axis of rotation communicating with the cavities so as to impel liquid by centrifugal force from the admission ports to the cavities, the circular disposition of said liquid admission ports being substantially concentric to but separated from the air ports so as separately to convey liquid from the admission ports to the cavities and air from the pockets to the air ports.

15. The method of producing a mixture of liquid and gas consisting of rotating a liquid by means of a rotatable casing whereby an inner free cylindrical surface of said liquid is formed, compressing a gas against said surface, and continuously removing a portion of the liquid and mixing it with the gas.

16. In a rotary pump, a rotatable casing, a rotatable wheel eccentrically mounted in the casing, and mechanical yielding means connecting the casing to the wheel so as to impart uniform rotation between the casing and the wheel.

17. In a rotary spray pump, an air discharge conduit, a rotatable casing normally partly filled with liquid, an air-pumping impeller mounted in the casing, the impeller having ports formed therein communicating with the conduit, means for discharging some of the liquid with the air through the conduit, and liquid supply means operating in unison with the casing for delivering additional liquid from an external source to the casing so as to maintain a substantially constant amount of liquid in the casing.

18. In a rotary pump of the class described, a casing, a wheel eccentrically mounted in the casing, the wheel having radially disposed pockets formed in the periphery thereof and ports formed in concentric circles around its axis of rotation communicating individually with the pockets, a stationary distributor having ports concentrically arranged therein co-operating with the ports in the wheel so as to convey fluid to and from the pockets in independent streams for each of the concentric circles of ports.

19. In a rotary pump for oil burners, a rotatable casing for whirling a ring of oil contained therein, a stationary scoop supported in the casing with one end directed against the path of the whirling oil for collecting oil, a valve in the path of the oil discharged from the scoop, and automatic means for opening and closing the valve in a repeating cycle.

20. In a rotary spray pump, a casing, air pressure means in the casing, fluid suction means in the casing for drawing a mixture of liquid and air into the casing, liquid feeding means in the casing for conveying liquid from the casing to the air pressure means, and centrifugal separating means in the casing for separating the air from the mixture of liquid and air so as to furnish a uniform volume of liquid for the liquid feeding means.

21. In a rotary pump of the class described, a rotatable casing for revolving a ring of liquid therein, a rotatable wheel having pockets formed in the periphery thereof, the wheel being eccentrically mounted in the casing so as to dip into the liquid whereby a pumping action is obtained through the movement of the liquid in the pockets, adjusting means for varying the eccentricity of the wheel with respect to the casing, and transmission means for transmitting rotation between the wheel and the casing irrespective of the adjustment of said eccentricity.

22. In a rotary pump, the combination of a rotatable casing for holding a revolving ring of liquid, an air-pumping impeller in the casing, a stationary axle rotatably supporting the impeller, the axle having its axis eccentric to the axis of the casing, the axle having an unsupported end in the casing, and a scoop carried by the unsupported end of the axle.

23. In a rotary pump, a casing, a wheel rotatably mounted in the casing, the wheel having sets of passages formed therein and ports through the wheel communicating individually with the passages, a distributor having separate ports arranged therein co-operating individually with the several ports in the wheel so as to convey independently a stream of liquid to one set of passages and air from another set of passages.

24. In a rotary pump, an air discharge conduit, a casing normally partly filled with liquid, an air-pumping impeller rotatably mounted in the casing, the impeller having ports formed therein communicating with the air conduit, a pair of liquid conduits, suction means cooperating with the casing and communicating with one of the liquid conduits for sucking liquid into the casing, and discharge means cooperating with the casing and communicating with the other liquid conduit to discharge surplus liquid from the casing so as to maintain a substantially constant amount of liquid in the casing.

25. In combination, a source of oil supply, a rotating casing for holding a revolving ring of oil which tends to assume an inside cylindrical surface, two pumping elements cooperating with the casing whereby independent pumping services are obtained, one of which draws oil from the source of supply and delivers to the rotating casing and the other of which draws oil from the rotating casing and delivers to the source of supply, the inlet to the last named pumping element being located at the position in said rotating casing at which the oil surface is to be maintained.

26. In combination, a source of liquid supply, a conduit, a rotating casing for holding a revolving ring of liquid which liquid tends to assume a cylindrical inside surface, three pumping elements mounted within and co-acting with the revolving ring of liquid whereby three independent pumping services are obtained, one of which draws liquid from the source of supply and delivers to the rotating casing, another of which draws liquid from the rotating casing and delivers to the source of supply, the inlet to the said last named element being located at the position in said rotating casing at which the liquid surface is to be maintained, and the third element drawing liquid from said rotating casing and delivering to said conduit.

27. In a pump having a casing, a rotor eccentrically operating in said casing, a valve operated by direct connection with said rotor, and controlling independently the intake of oil and air to said casing, means within said rotor for controlling the discharge of the oil and air from the casing, and supporting means for the rotor.

28. A pump having a cylinder, a rotor eccentrically operating in said cylinder, a valve operated by direct connection with the rotor and separately controlling the intake of oil and air to said cylinder, means within the rotor controlling the discharge of the oil and air from said cylinder, and a casing enclosing said pump.

29. In an apparatus of the character described, a rotatable casing for whirling a ring of oil contained therein, a scoop supported in said casing with one end directed against the path of the whirling oil for collecting oil, a valve in the path of the oil discharged from said scoop, and automatic means for maintaining a uniform supply of oil in said casing.

30. In a rotary air-pump, a rotatable casing, an impeller eccentrically mounted to rotate in said casing, said casing having a central air inlet opening formed therein, and air-discharge conduit-means extending through said inlet opening and communicating with said impeller.

31. In a rotary pump of the class described, a rotatable casing for revolving a ring of sealing fluid, a rotatable wheel eccentrically mounted in the casing so as to dip into the fluid, and means for adjusting the eccentricity of the wheel in the casing so as to vary the depth of submergence of the wheel in the fluid and thereby control the displacement of the pump.

32. In a rotary pump, a rotatable casing, a rotatable wheel eccentrically mounted in the casing, means for rotating the casing, and a connecting-rod for transmitting rotation from the casing to the wheel.

33. In a rotary pump, a rotatable fluid-tight casing, a rotatable wheel in the casing, mechanical means for rotating both casing and wheel in the same direction at the same angular velocity so as to minimize friction losses in the pump.

34. In an apparatus of the character described, the combination of a casing for holding a rotating body of oil therein, a discharge scoop supported in said casing with one end directed against the path of the rotating oil for collecting oil, adjusting means for moving said end of said scoop in order to control the discharge of oil from said scoop, and means for maintaining a substantially uniform amount of oil in said casing irrespective of the position of said end of said scoop.

WM. DOUGLAS CARTER.